United States Patent [19]

Niccolls

[11] Patent Number: 4,782,746

[45] Date of Patent: Nov. 8, 1988

[54] MEANS FOR PUMPING BASTING FLUID

[76] Inventor: Paul L. Niccolls, 1300 S. Roach St., California, Mo. 65018

[21] Appl. No.: 41,325

[22] Filed: Apr. 22, 1987

[51] Int. Cl.⁴ .......................... A23L 1/32; A23L 3/34
[52] U.S. Cl. ........................................ 99/532; 99/535
[58] Field of Search ................. 99/532, 533, 535, 516; 417/403, 392; 222/46, 48, 387, 389; 92/13.8

[56] References Cited

U.S. PATENT DOCUMENTS 43331,071 5/1982 Niccolls ............................... 99/532

Primary Examiner—Timothy F. Simone
Attorney, Agent, or Firm—Mason, Fenwick & Lawrence

[57] ABSTRACT

A liquid basting injector for poultry or the like has a liquid container in which an inflatable bladder is positioned for cyclic inflation and deflation to effect pumping of liquid from the container through an outlet control air is provided through a shuttle valve from a line and a liquid control valve to injector needle. Control signal line connected to a delay means which vents the control line periodically to shift the liquid control valve to a closed position and to also shift an air control valve connected to the inflatable bladder to permit the bladder to be cyclically inflated and deflated to effect a pumping operation from the container. During deflation the container is refilled with fluid which during a cleaning mode of operation will be cleaning fluid but will be basting fluid during a basting mode of operation. In the basting mode of operation control of the liquid and gas control valve is also maintained by a timer to effect proper cycling of the control valve connected to the bladder and the liquid output line from the container. However, during the basting mode of operation it is necessary for the operator to position a finger over a control vent in the handle of the injector needle in order for the basting cycle to be initiated and in order for the cycle to continue. Thus, optimum control is provided for the operator. However, the timers provided in the pneumatic circuitry are adjustable for effecting the injection of a predetermined quantity of fluid as required for the particular circumstances.

17 Claims, 3 Drawing Sheets

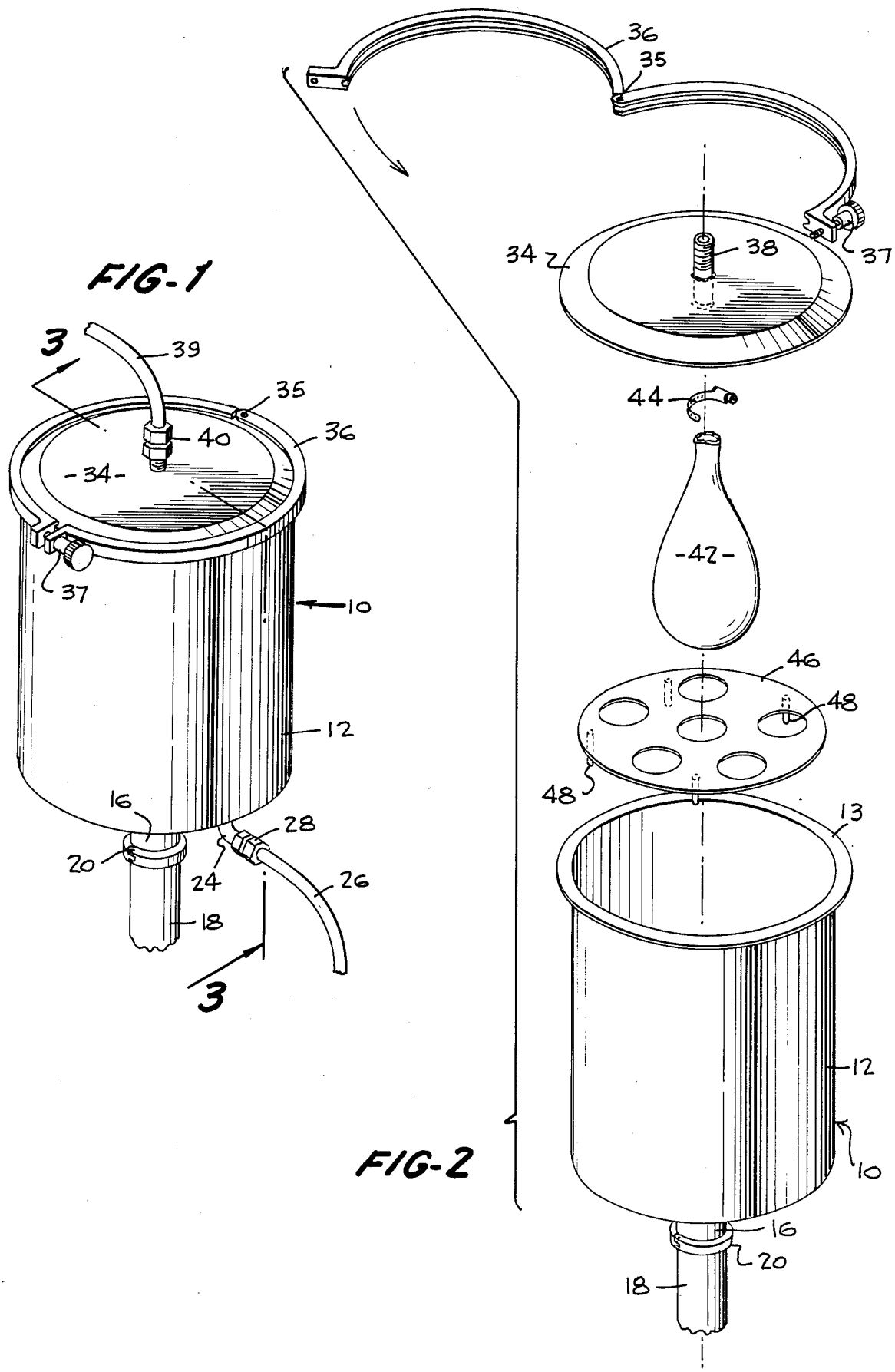

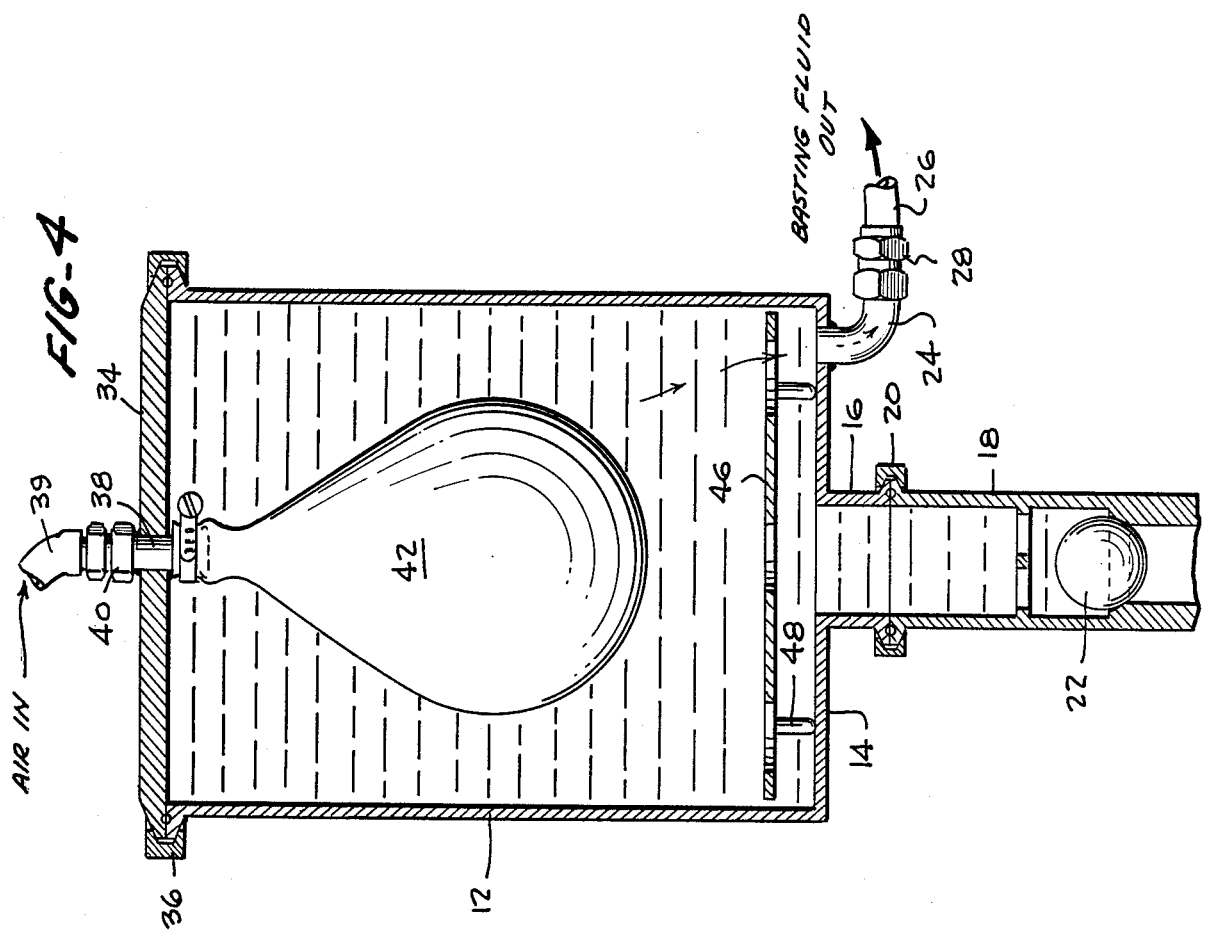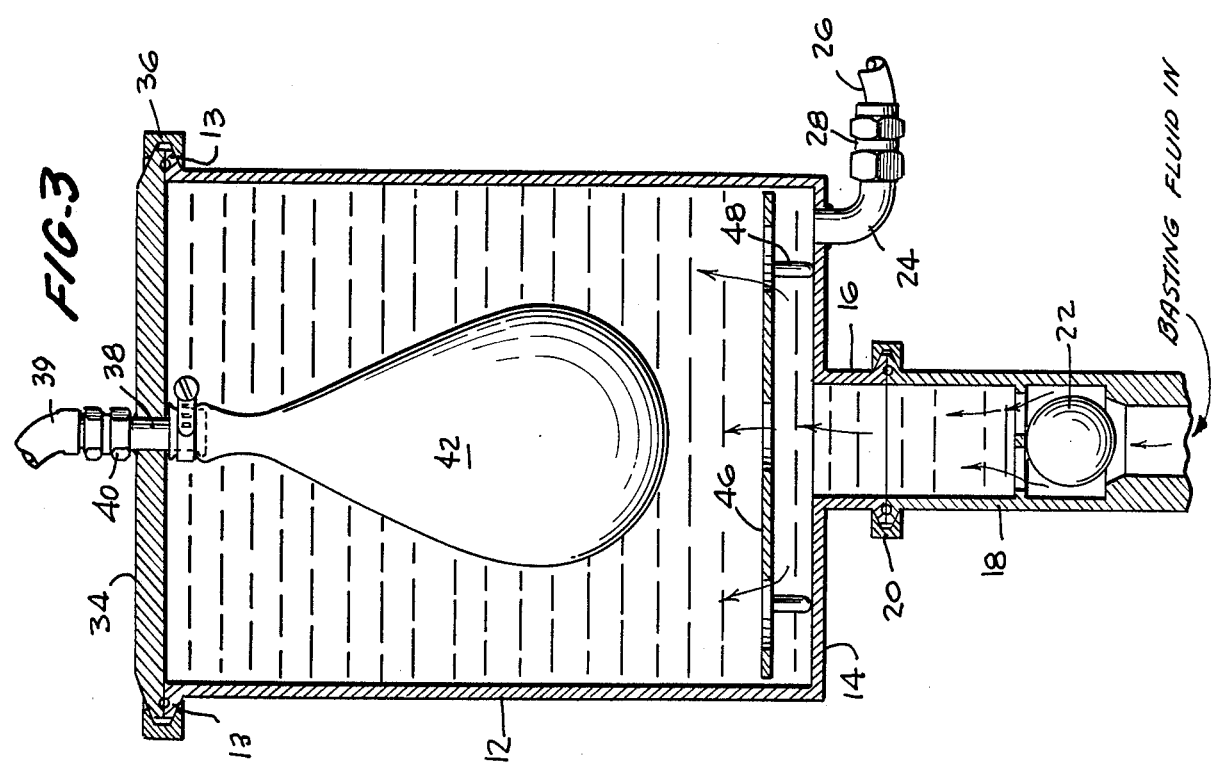

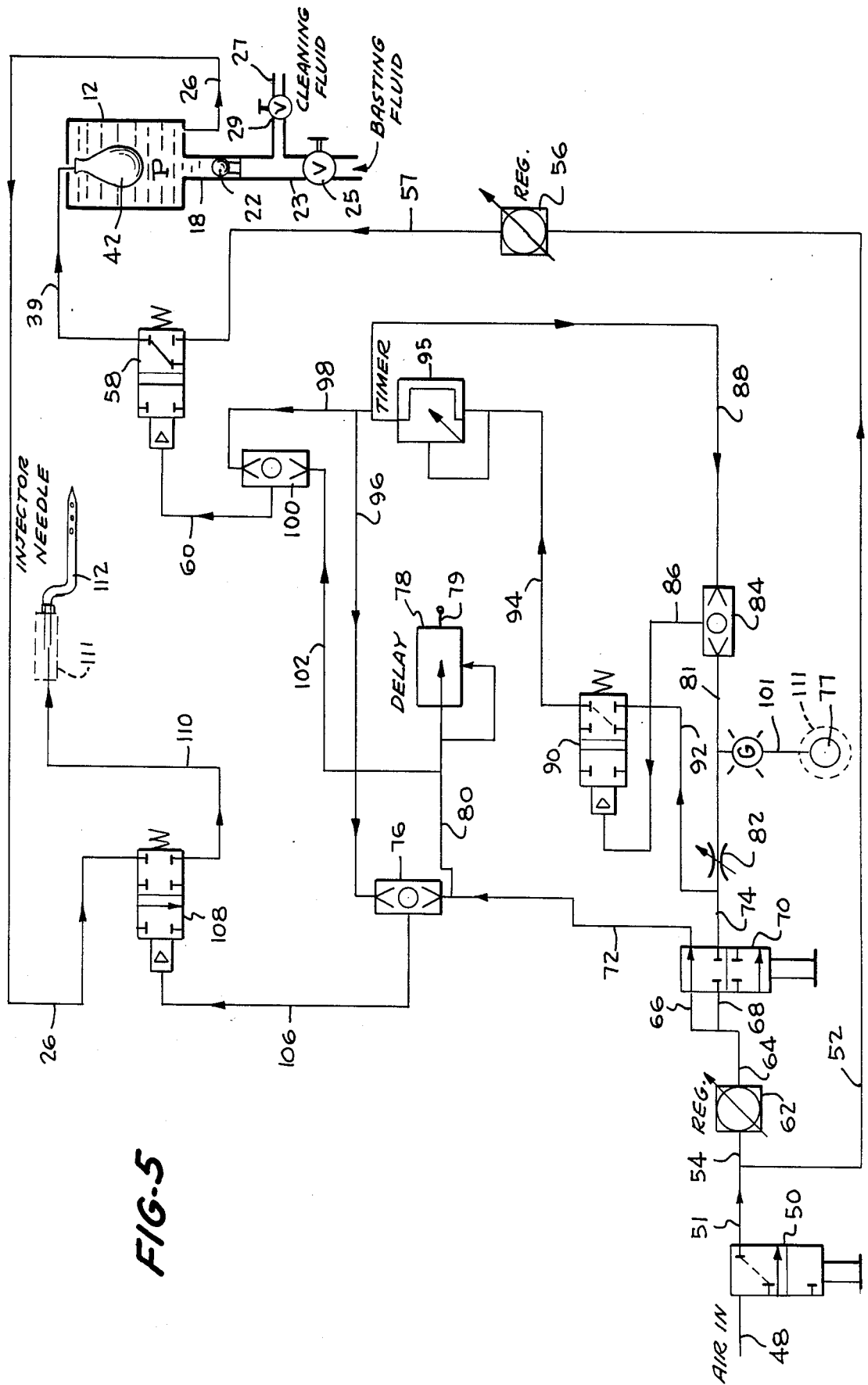

MEANS FOR PUMPING BASTING FLUID

BACKGROUND OF THE INVENTION

Various devices have been previously employed for injecting liquid basting material in poultry or other meats for many years. Initially, the amount of liquid basting material injected at any particular location in the fowl was determined by the judgement by the operator. Unfortunately, great variations in the amount of basting material injected consequently resulted with some fowl receiving more basting material than was desirable while others received less than was desirable. Another prior problem with the prior art basting material injection equipment is that it is difficult to thoroughly and completely clean the equipment with disassembly being frequently necessary to effect a thorough cleaning. While my prior U.S. Pat. No. 4,331,071 represented a substantial step forward in obtaining an accurate injection of a predetermined quantity of basting fluid, the need for easily cleaned basting equipment remained unfulfilled both by it and other prior known injection equipment such as exemplified in U.S. Pat. Nos. 801,612; 982,601; 3,590,722; 3,636,857; 4,356,762 and the prior art cited in my aforementioned U.S. Pat. No. 4,331,071.

Therefore, it is the primary object of the present invention to provide basting injection equipment which will automatically inject a predetermined amount of basting fluid and which is also easy to clean and use in both a basting fluid injection mode of operation and a cleaning mode of operation.

SUMMARY OF THE INVENTION

Achievement of the object of the present invention is enabled by the preferred embodiment which comprises a pump formed of a pressurizable liquid container having an inflatable bladder on its interior with the bladder being connectable to an air line which is cyclically provided with pressurized air and then subsequently vented. A fluid outlet line extends from the bottom of the container and a fluid supply line including a check valve is in communication with the bottom of the container so that the cyclic pulsation of the bladder causes the container to act as a pump for forcing fluid from the container outwardly through a discharge line connected through selectively operable pneumatic valve means to an injection needle mounted on a handle which additionally includes a control vent communicating with an air line for control purposes. The fluid provided in the container will be basting fluid during a basting operation or will be cleaning fluid when the system is being cleaned.

The preferred embodiment includes pneumatic circuitry for automatically controlling both the cleaning and basting modes of operation through the use of compressed air for actuating various valves for controlling the flow of liquid from the pressurizable container. More specifically, a mode-select hand operable main control valve is connected to the output of a pressure regulator and is movable to a first clean mode position and a second or inject mode position for effecting either equipment cleaning or basting liquid injection functions. When the mode-select valve is in the cleaning mode position it provides pressurized air to one inlet of a first shuttle valve having two inlets and an outlet so that the pressurized air is directed from the outlet of the shuttle valve to a control port on a pneumatically operable liquid control valve provided in the fluid discharge line from the pressurizable container. The pressurized air causes the aforementioned fluid control valve to move to an open position so that fluid can flow from the pressurizable container to the injector needle. Additionally, the outlet line from the mode-select valve is also connected to a control port of an air control shuttle valve having two inlets and an outlet which is connected to the control port of an air valve to open same upon the application of pressure to the control port. The air valve is mounted in a air pressure line extending from the source of compressed air to the interior of the bladder in the pressurizable container. A delay means is connected to the output line from the mode-select valve and vents the line periodically in a cyclic manner so that the fluid control valve and the air control valve return to their original positions in which the fluid control valve closes the fluid line from the container and the air control valve vents the bladder in the container so that additional charge of basting fluid can flow into the container from its low pressure source to fill the container to permit a further cycle of operation. A further cycle of operation occurs when the delay means cycles to a closed condition to permit repressurizing of the output line from the mode-select line and consequent reactivation of the valve members to result in a further pumping cycle of operation with the process being continued indefinitely to fully clean the container and the lines flowing therefrom.

On the other hand, during a basting operation the mode-select valve is positioned to direct pressurized air to a second output line with the first output line being blocked. A portion of the pressurized air in the second output line travels through a flow regulator for connection to one inlet of a third shuttle having a second inlet and an outlet which is connected to the control port of an injection control valve mounted in a line extending from the second outlet from the mode-select valve which valve is normally positioned to block the line. However, the application of a control signal opens the valve so that air pressure can travel to timer means to initiate a timing cycle during which the air moves through the timer to the shuttle valve having the output connected to the control port of the gas valve in the air pressure line connected to the bladder in the pressurizable container as discussed previously. Consequently, the gas valve is moved to an open position. However, one very significant aspect of the invention resides in the fact that the air line between the control valve and the last-mentioned shuttle valve is provided with a vent line having a control vent opening in the handle of the injector needle. The control vent opening prevents the last-mentioned shuttle valve from shifting to provide the control signal to the injection cycle initiate valve unless the control vent opening is blocked. The reason for the foregoing is that blocking of the control vent permits sufficient pressure to build up on the line connected to the inlet of the last shuttle valve to shift same and provide a control signal to the basting initiate mode valve. Consequently, the operator can initiate the actual injection by simply positioning is finger over the control vent. Additionally, it should be understood that the timer means operates for a predetermined time period to discontinue the supply of pressurized air to the pneumatically controlled valves to effect ending pumping cycle.

A better understanding of the manner in which the preferred embodiment achieves the object of the invention will be enabled when the following detailed descriptions considered in conjunction with the appended drawings.

BRIEF DESCRIPTION OF THE DRAWINGS

FIG. 1 is a perspective view of a basting fluid dispenser container for employed in the preferred embodiment of the invention;

FIG. 2 is an exploded perspective view of the pressurizable basting fluid dispensing container of FIG. 1;

FIG. 3 is a sectional view taken along lines 3—3 of FIG. 1 and illustrating the parts in a filling mode of operation in which basting fluid is flowing into the container;

FIG. 4 is a sectional view similar to FIG. 3 but illustrated in parts in a basting fluid dispensing mode of operation; and FIG. 5 is a pneumatic/hydraulic circuit diagram illustrating control means for the preferred embodiment.

DESCRIPTION OF THE PREFERRED EMBODIMENT

Attention is initially invited to FIGS. 1 through 4 of the drawings which illustrate a pressurizable fluid dispenser container 10 which receives and dispenses either basting fluid or cleaning fluid under the control of the control circuitry illustrated in FIG. 5. The pressurizable fluid dispenser 10 includes a cylindrical main body portion 12 having an integral bottom wall 14 from which an axial tubular liquid supply fitting 16 extends downwardly for connection to a check valve housing 18 connected to the lower end of axial tubular fitting 16 by a ring coupling 20. A ball check member 22 is mounted in the check valve housing 18 for movement between a open position illustrated in FIG. 3 and a closed position illustrated in FIG. 4. Referring briefly to FIG. 5, the lower end of the check valve housing 18 is connected to a tube or pipe 23 including a valve 25 extending from a source of basting fluid, such as for example an elevated tank, which provides basting fluid at a low pressure to the inlet of the check valve housing 18 so as to normally tend to inject basting fluid into the container 10 in an obvious manner. The inlet to valve housing 18 is also connected to a tube or pipe 27 including a valve 29 and which is connected to a source of conventional cleaning and disinfecting fluid. The bottom wall 14 of the container 10 is also provided with a fluid discharge line 24 which is connected to a flexible hose or conduit 26 by compressible coupling means 28. The opposite end of flexible hose or conduit 26 is connected to an injector needle 112 (FIG. 5) mounted on a handle 111.

The pressurizable fluid dispensing container 10 further includes a removable top plate or cover 34 which is clamped to upper flange 13 of the cylindrical main body portion 12 by a circular hinge clamp 36 which includes a pivot 35 and locking screw 37. An axially positioned air inlet and exhaust tube 38 is mounted in top plate 34 and is connected to a control air hose or line 39 by coupling 40. An inflatable bladder 42 is attached to the lower end of tube 38 by conventional clamp means 44 so as to receive air from line 39. A baffle plate 46 is supported by legs 48 resting on the upper surface of bottom wall 14 of the container 10. Baffle plate 46 serves to prevent balloon 42 from blocking the fitting 16 and the fluid discharge line 24 in an obvious manner.

The means for effecting operation and control of the system will now be discussed in detail with reference being made to FIG. 5 in which the pneumatic control components and the fluid injection means are schematically illustrated. More specifically, a source 48 of compressed air is connected to a manually operated main air control valve 50 having an output line 51 which splits into a main power supply line 52 and a control supply line 54. Main power supply line 52 is connected through a power pressure regulator 56 to a pneumatically controlled air valve 58 from which air line 39 extends to its connection to the air inlet and exhaust tube 38 on container 12. It should be noted that the pneumatically controlled air valve 58 is in the position illustrated in FIG. 5 when there is an absence of pressurized air in a pressure signal line 60 connected to a control port on valve 58. Consequently, line 39 is vented to atmosphere through valve 58 cannot supply pressurized air to bladder 42 in the absence of a control pressure signal in line 60. However, when air pressure is introduced into line 60 it shifts the valve 58 to the right so as to connect line 52 to line 39 to provide compressed air to the interior of balloon-like bladder 42.

Control supply line 54 provides pressurized air to a control pressure regulator 62 having an output line 64 which branches into lines 66 and 68 each of which is connected to a mode-select hand operated air valve 70 from which air control lines 72 and 74 extend. Line 72 is connected to a first shuttle valve 76 and to an adjustable delay valve 78 having an exhaust vent 79 by a vent signal initiate line 80. A control signal line 106 extends from shuttle valve 76 to a control port on a liquid control valve 108 from which a liquid supply line 110 extends to injector needle 112. Additionally, it should be noted that previously discussed flexible hose or conduit 26 is connected to an inlet port on liquid valve 108.

Line 74 is connected to an adjustable flow control valve 82 from which injection function control line 81 extends to a second shuttle valve 84 to which an output line 86 is connected; a further line 88 is connected to shuttle valve 84. Line 86 is connected to a control port on pneumatically actuated injection cycle control valve 90 to which a pressure line 92 from a point upstream of the adjustable flow control valve 82 is also connected. A high pressure output line 94 extends from valve 90 to timer means 95. Timer 95 is also connected to line 88 from which branch lines 96 and 98 respectively extend to shuttle valve 76 and a first inlet port of a third shuttle valve 100. Additionally, a high pressure connector line 102 extends between line 80 and a second inlet port of third shuttle valve 100 as shown. It should also be noted that line 101 extends from line 81 to a control vent port 77 provided in handle 111 (as symbolically shown in FIG. 5) and includes an indicator light G which is illuminated when there is air pressure in line 81. Control vent port 77 is provided in handle 111 so that a users finger can block the vent port 77 for control purposes to be described.

It should be observed that the control system illustrated in FIG. 5 is capable of operating the device in two modes of operation comprising a cleaning mode and an injection mode. Firstly, when valve 70 is positioned as shown in FIG. 5 the system operates to continuously pump cleaning fluid from line 27 through container 12 to the injector needle 112 in a pulsating manner to thoroughly clean the system of all remnants of basting fluid. During the aforementioned operation valve 25 is closed to isolate the source of basting fluid from the check valve 18 and valve 29 is opened to place the source of cleaning fluid in communication with check valve 18. Secondly, when the mode-select hand operated air valve 70 is in the opposite position from that illustrated in FIG. 5, valve 25 is open and valve 29 is closed and the system operates to provide basting fluid to and through needle means 112.

The cleaning mode of operation will be initially discussed with it being assumed that valve 70 is in the illustrated position of FIG. 5. Main air control valve 50 is moved from the closed position illustrated in FIG. 5 to the open position in which the air source line 48 is directly connected to output line 51 so that compressed air is provided to lines 54 and 52. The compressed air provided in line 52 passes through regulator 56 and is provided at a preselected pressure through line 57 to the inlet of valve 58. However, at the beginning of the cycle of operation valve 58 is in the illustrated position and line 57 is consequently blocked and therefor compressed air is not being conveyed beyond valve 58. Line 54 is connected to regulator 62 and provides control pressure air to line 64 which passes through line 66 and valve 70 into the main control air supply line 72 which is connected to the shuttle valve 76 and to delay means 78. Delay means 78 is constructed so that the application of a pressure signal to it initiates the beginning of a cycle countdown period at the end of which delay 78 vents line 80 along with associated line 72 to the atmosphere via exhaust vent 79 for a purpose to be discussed hereinafter. However, the initial application of a pressure signal through line 72 to line 80 results in a provision of the pressure signal through line 102 to shuttle 100 from which the pressure signal travels through line 60 to the pneumatically controlled air valve 58 which is immediately moved to the open positioned in which line 57 is placed in communication with line 39 to cause power air to be supplied to the interior of bladder of 42. The supply of the power air to bladder 42 obviously increases the pressure in the bladder and also consequently increases the pressure on the liquid in container 12 to close check valve 22 and force cleaning fluid in container 10 from the container into fluid discharge line 26.

Generally, the provision of a control signal to line 72 substantially simultaneously opens the shuttle 76 at the same time that shuttle 100 is open. The opening of shuttle 76 provides a control signal through line 106 to valve 108 which is consequently moved to its open position to permit the pressurized cleaning fluid in container 10 to be discharged through line 26, valve 108 and line 110 through needle 112 to effect cleaning of the parts through which the cleaning fluid is forced. However, after a predetermined time delay of 1 and 1½ to 2 seconds, delay 78 vents lines 72, 80, 102 and 60 to atmosphere and pressurization of air in line 60 is terminated and valve 58 consequently moves to its closed position to terminate the application of power pressure to bladder 42. Similarly, the venting of line 80 by delay 78 also causes the termination the of control air through line 106 to valve 108 which consequently immediately moves to its blocking position illustrated in FIG. 5 in which liquid can no longer flow from line 26 to line 110. The removal of the control air signal from line 60 also results in venting of line 39 so that the air in bladder 42 is immediately exhausted to atmosphere through valve 58. Since the cleaning fluid is provided at a slight pressure in line 27, check valve 22 immediately opens and the container 12 is refilled with cleaning fluid. However, delay valve 78 consequently closes to stop venting through the vent 79 and lines 72 and 80 immediately become repressurized to initiate a repeat cycle of operation which will indefinitely continue in cyclic manner until either valve 50 is moved to the illustrated blocking position of FIG. 5 or valve 70 is moved to the opposite from that illustrated in FIG. 5. However, it should be understood that prior to the termination of the cleaning cycle all of the cleaning fluid is exhausted from the system and pure water is pumped into the system to remove all traces of the cleaning fluid.

An injection cycle is initiated by the positioning of valve 70 in the opposite position from that of FIG. 5 so that pressurized air flows from line 68 through valve 70 into line 74 while line 68 is completely blocked from communication with line 72. The pressurized air from line 68 flows into line 74 from which it travels through line 92 to the inlet port of valve 90. Additionally, pressurized air in line 74 also passes through regulator 82 to line 81 and to shuttle valve 84. If the user's finger is covering the control vent 77, pressure will build-up in line 81 sufficiently to shift shuttle 84 to provide a control signal through line 86 to valve 90 to shift the valve 90 from the illustrated position to its other position in which line 92 is in communication with line 94 to provide pressurized air to timer 95 to start an activation period for the timer during which air from an outlet port of timer 95 flows into branch lines 88, 96 and 98 with several results consequently being accomplished. Firstly, the air in line 98 shifts shuttle 100 so that pressurized air is supplied to line 60 to shift valve 58 from its illustrated vent position to its other position in which lines 57 and 39 are in communication. Bladder 42 is consequently pressurized to expel basting fluid through line 26 to valve 108. Additionally, the provision of pressurized air in line 98 also results in pressurized air flowing through line 96 to shuttle 76 which is shifted to cause pressurized air to enter line 106 to shift valve 108 so that the valve is moved to place lines 26 and 110 in communication to permit the basting fluid to be ejected from needle 112.

After a predetermined time period the timer 95 terminates its activation period and begins an idle period in which the supply of pressurized air to line 98 is terminated so that valve 58 shifts to its vent position and line 39 is consequently vented to permit bladder 42 to deflate so that the container 12 is refilled with basting fluid from a low pressure source connected to valve 25. Additionally, the termination of pressurized air in line 98 also results in the movement of valve 108 to its blocking position so that lines 26 and 110 are no longer in communication. Timer 95 remains in its idle condition in which lines 94 and 98 cannot communicate for a predetermined time period sufficient to permit the container 12 to be filled with the basting fluid. However, upon termination of the last mentioned time period, timer 95 opens the connection it provides between lines 94 and 98 so that shuttles 76 and 100 are again shifted to cause air to flow through line 60 to valve 58 to shift the valve to the position in which lines 39 and 57 are in communication. Similarly, shuttle 76 is shifted to provide air through 106 to shift valve 108 to place lines 26 and 110 in communication to initiate a repeat cycle.

It should be observed that the cycle will be repeated ad infinitum since valve 90 continues to remain in its right hand position in which lines 92 and 94 are in communication until such time as valve 70 is returned to the position illustrated in FIG. 5 or the operator removes his finger from vent 77.

While only a preferred embodiment of the invention has been illustrated, it should be understood that the spirit and scope of the invention is not limited to the preferred embodiment since numerous modifications thereof will occur to those of skill in the art. Therefore, the scope of the invention is limited solely by the following claims.

I claim:

1. Means for dispensing a quantity of fluid comprising:
   (a) a pressure tight container including a fluid inlet opening, a fluid outlet opening and a gas inlet;
   (b) a fluid discharge line having opposed first and second ends and including fluid injection means, said first end being connected to said fluid outlet opening;
   (c) a source of pressurized gas;
   (d) a gas line having opposed first and second ends connected respectively to said source of pressurized gas and to said gas inlet;
   (e) pressure actuated gas valve means having a control signal inlet port and first and second ports connected in said gas line for normally venting said pressure tight container and closing said gas line to prevent gas from flowing from said source of pressurized gas into said pressure tight container but including pressure responsive control means communicating with said control signal inlet port for opening said gas line to permit pressurized gas from said source of pressurized gas to flow to said pressure tight container;
   (g) a fluid control valve mounted in said fluid discharge line for normally blocking fluid flow through said fluid discharge line but additionally including a control signal input port and a pressure responsive control means, said pressure responsive control means communicating with said control signal input port for opening said fluid discharge line to permit fluid to be discharged from the pressure tight container through said fluid discharge line and said fluid injection means in response to an input pressure signal; and
   (h) control means operable for cyclically actuating said gas valve means and said fluid control valve to cause pressurized gas to enter said pressure tight container to force fluid from said container into said fluid discharge line and to cause said gas valve means to vent gas from said pressurized container to permit liquid to flow into said container following which the cycle is repeated.

2. The invention of claim 1 wherein said control means additionally includes means for terminating cyclic operation of said gas valve and said fluid control valve in response to the venting of control air from said injection means.

3. The invention of claim 1 wherein said control means includes:
   (a) a first shuttle valve having two inlets and a discharge opening;
   (b) a mode-select valve having an inlet connected to said source of pressurized gas and also having a first outlet and a second outlet and being positionable in a first position for connecting said source of pressurized gas to said first outlet and also being positionable in a second position for connecting said source of pressurized gas to said second outlet.
   (c) a first air control line extending from said first inlet of said first shuttle valve to said first outlet of said mode-select valve; and
   (d) a control signal air line extending from said discharge opening of said shuttle valve to said control signal input port of said fluid control valve.

4. The invention of claim 3 wherein said control means further includes:
   (a) a second shuttle valve having first and second inlet ports and a discharge port;
   (b) an injection cycle control valve having an inlet port, an outlet port and a control signal port for placing said inlet and outlet ports in communication in response to a pressure signal provided to the control signal port;
   (c) a timer having an inlet port and an outlet port for providing pressured gas to said outlet port for a predetermined time period following the application of pressurized gas to said inlet port;
   (d) a third shuttle valve having first and second inlet ports and an output port;
   (e) a pressure signal line extending between said outlet port of said third shuttle valve and said control signal inlet port of said pressure actuated gas valve means;
   (f) first, second and third branch lines respectively communicating said outlet port of said timer with said second inlet port of said second shuttle valve, said first inlet port of said third shuttle valve and said second inlet port of said first shuttle valve;
   (g) a flow control valve having an inlet and an outlet;
   (h) an injection function control line connecting the outlet of said flow control valve to the first inlet of said second shuttle valve;
   (i) a control signal line connecting the discharge port of said second shuttle valve with the control signal port of the injection cycle control valve;
   (j) an air control line connecting said second outlet of said mode select valve to the inlet of said flow control valve;
   (k) selectively operable vent means connected to said injection function control line for venting same to atmosphere to prevent a sufficient buildup of pressure in said injection function control line to shift said second shuttle valve;
   (l) delay means having an inlet and an exhaust vent including means for venting said inlet to atmosphere through said exhaust vent a predetermined time period after the application of pressurized gas to said inlet;
   (m) a vent signal line extending from said first air control line to the inlet of said delay means; and
   (n) a connector line extending between said vent signal line and the second inlet port of said third shuttle valve.

5. The invention of claim 4 wherein said fluid injection means comprises an injector needle assembly including a handle.

6. The invention of claim 5 wherein said selectively operable vent means comprises a port in said handle dimensioned and shaped so that it can be blocked by a users finger.

7. Basting fluid injection means comprising
   (a) an injector needle;
   (b) pump means;
   (c) a liquid supply means having opposed first and second ends, said first end being connected to said pump means for supplying pressurized basting liquid to said injector needle;

(d) an air flow passage adapted to have air flow therethrough and associated with said injector needle so as to be capable of being blocked to preclude the flow of air therethrough or unblocked to permit the flow of air therethrough;

(e) control means responsive to said air flow passage being unblocked for precluding actuation of said liquid supply means or for terminating actuation of said liquid supply means.

8. The invention of claim 7 wherein said air flow passage comprises a control air vent.

9. The invention of claim 8 additionally including handle means on said injector needle.

10. The invention of claim 9 wherein said control air vent is mounted in said handle means.

11. The invention of claim 8 wherein said pump means comprises a compressed air powered pump.

12. The invention of claim 11 wherein said control means includes:

(a) a source of pressurized air;

(b) a pneumatically controlled power air valve having an inlet connected to said source of pressurized air and an outlet connected to said pump means for powering said pump means and including means for precluding the supply of pressured air to said pump in the absence of a control pressure signal to said air valve; and (c) a control pressure signal valve means movable to an open position for supplying a control pressure signal to said pneumatically controlled power air valve in the absence of a control pressure signal to said control pressure signal valve means; and (d) control air supply means connected to said control pressure signal valve means and to said control air vent so that the unblocked condition of said control air vent prevents the containment or maintenance of sufficient pressure to provide a pressure signal to said control pressure signal valve means.

13. The invention of claim 12 additionally including handle means on said injector needle.

14. The invention of claim 13 wherein said control air vent is mounted in said handle means.

15. The invention of claim 13 additionally including a second source of control pressure signal for said power air valve selectively operable independently of said control pressure signal means for effecting continuous operation of said pump means independently of the condition of said control air vent means.

16. The invention of claim 12 additionally including handle means on said injector needle.

17. The invention of claim 16 wherein said control air vent is mounted in said handle means.

* * * * *